T. E. COLLINS.
STARTER.
APPLICATION FILED MAR. 7, 1919.

1,344,291.

Patented June 22, 1920.
6 SHEETS—SHEET 1.

Witnesses:
Harry R. White
W. F. Kilroy

Inventor
Thomas E. Collins
Brown Boettcher Dinner
Attys

T. E. COLLINS.
STARTER.
APPLICATION FILED MAR. 7, 1919.

1,344,291.

Patented June 22, 1920.
6 SHEETS—SHEET 5.

Witnesses
Harry R. White
W. F. Kilroy

Inventor:
Thomas E. Collins
By Brown, Boettcher & Dienner
Attys.

T. E. COLLINS.
STARTER.
APPLICATION FILED MAR. 7, 1919.

1,344,291. Patented June 22, 1920.
6 SHEETS—SHEET 6.

Witnesses:
Harry R. White
W. A. Kilroy

Inventor:
Thomas E. Collins
By Brown Boettcher & Dienner
Attys.

UNITED STATES PATENT OFFICE.

THOMAS E. COLLINS, OF CHICAGO, ILLINOIS.

STARTER.

1,344,291.

Specification of Letters Patent. Patented June 22, 1920.

Application filed March 7, 1919. Serial No. 281,259.

*To all whom it may concern:*

Be it known that I, THOMAS E. COLLINS, a citizen of the United States, residing at Chicago, in the county of Cook and State of Illinois, have invented a certain new and useful Improvement in Starters, of which the following is a full, clear, concise, and exact description, reference being had to the accompanying drawings, forming a part of this specification.

My invention relates to starters for engines, particularly such starters as are employed in connection with internal combustion engines for turning the engine over a sufficient number of times to insure firing of the initial charge, whereupon the engine will take up and run under its own power. Devices of this character are particularly adapted for use in modern automobile and allied practices, due to the frequent necessity in such practices for the performance of the starting operation.

My invention aims to provide a starter for internal combustion engines having a power accumulating apparatus which is adapted to be mechanically energized by the operation of the engine.

My invention aims further to provide a starter for internal combustion engines wherein the power accumulating apparatus is normally uncoupled from the engine, suitable manually actuated controlling means being provided whereby the power accumulating apparatus may be coupled to the engine at the will of the driver, the energy stored in the power accumulating apparatus by the previous operation of the engine being simultaneously released to turn the engine over a sufficient number of times to insure firing of the initial charge, whereupon the engine will take up and run under its own power.

My invention aims further to provide a starter for internal combustion engines wherein, upon starting of the engine, suitable reënergizing mechanism is adapted to be coupled to the engine, whereupon the power accumulating apparatus will be again mechanically energized by the operation of the engine; means being provided for automatically uncoupling the reënergizing mechanism from the engine when the power accumulating device has been sufficiently energized.

My invention aims still further to provide a starter for internal combustion engines of simple and durable construction, reliable and effective in operation and wherein all the operative parts thereof will be readily accessible without disconnecting the starter from the engine, thus facilitating inspection and repairs.

In order that those skilled in the art may be fully acquainted with the nature and scope of my invention I shall describe an illustrative embodiment of the invention in connection wth the accompanying drawings, which form a part of the present specification.

Figure 1:
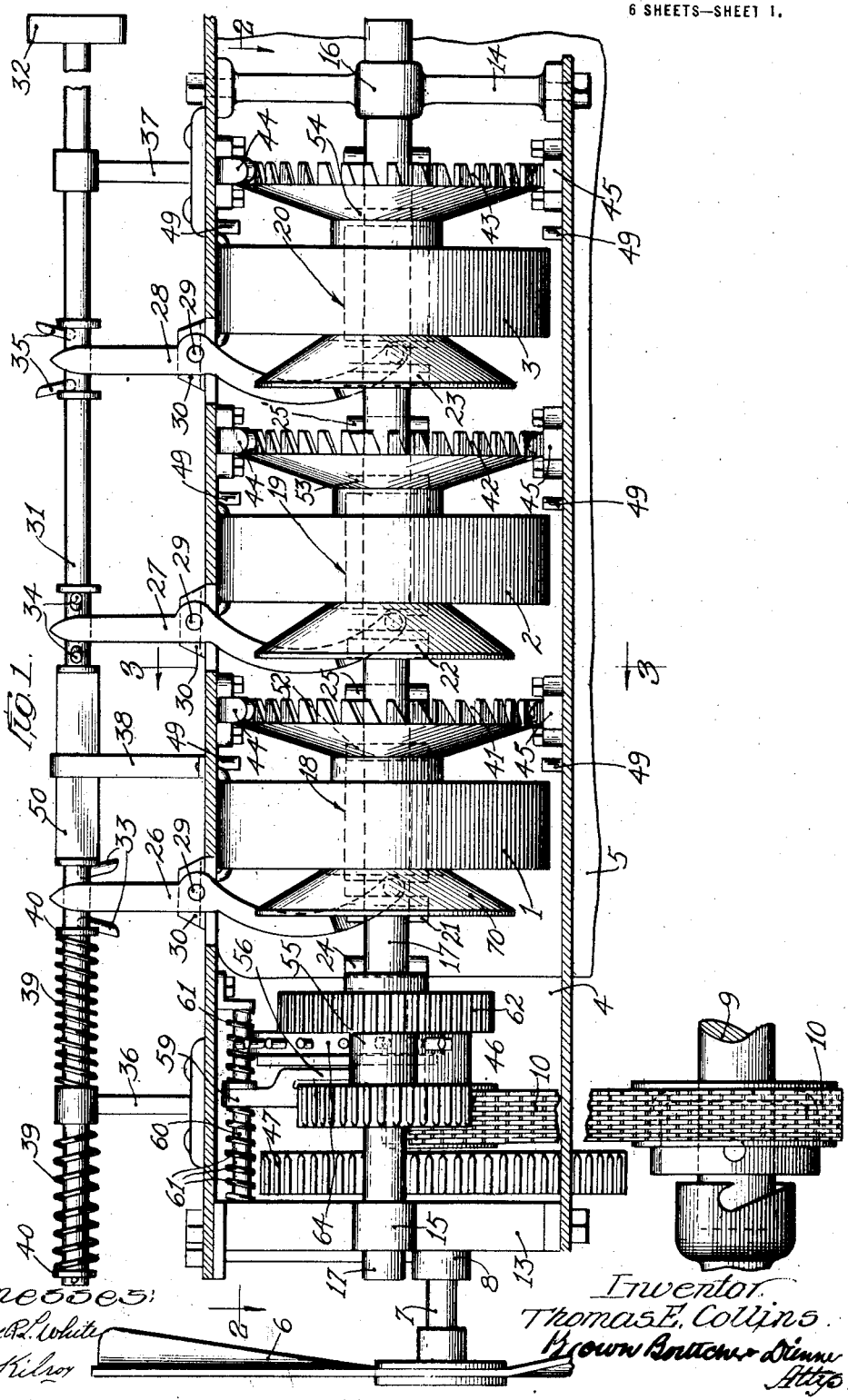
Figure 1 shows in longitudinal vertical section an illustrative embodiment of my invention.
Figure 3:
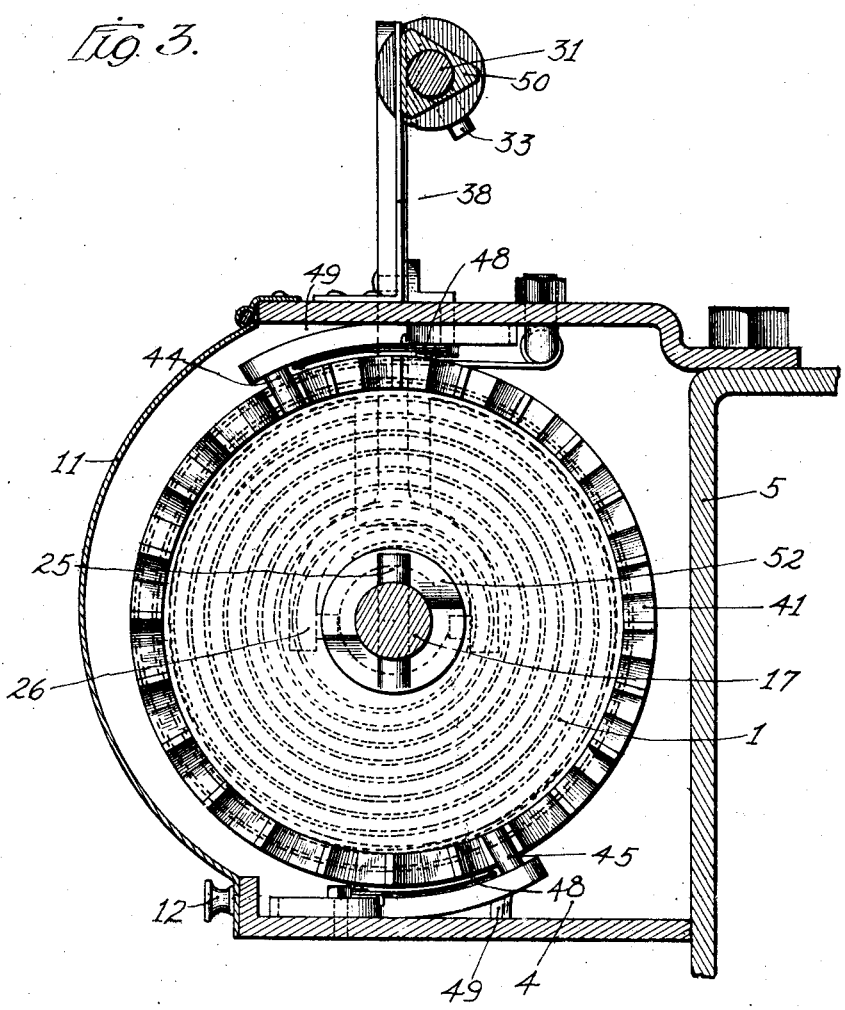
Fig. 3 is a transverse sectional view taken on the line 3—3 of Fig. 1.

Although the starting device shown in longitudinal vertical section in Fig. 1 may comprise one or more power accumulating springs, three spiral springs, 1, 2 and 3 are shown. As will be hereinafter explained, I have provided for accumulating sufficient power or energy in either one or all of the springs 1, 2 and 3 during the operation of the engine to again start the engine at the will of the driver. The power accumulating springs 1, 2 and 3 and associated mechanisms are preferably inclosed in a suitable housing 4. The housing 4 is adapted to be mounted within the hood of an automobile, as for example, upon the engine 5, the cylinder walls of the engine in such event forming the inner wall of the housing 4 as illustrated in Fig. 3.

A cooling fan 6 is provided and mounted in the usual manner on the front end of the engine 5. The fan 6 is carried on a shaft 7, which shaft is journaled in suitable bearings 8. The fan shaft 7 is driven from the crank shaft 9 of the engine 5 by means of a suitable chain belt 10. An access door 11 is hingedly secured along the outer edge of the top wall of the housing 4, whereby access to the starting mechanism inclosed therein may be readily had, thus facilitating inspection and repairs. Finger pieces 12 are provided adjacent the lower edge of the access door 11 for retaining the door in its closed position.

Figure 2:
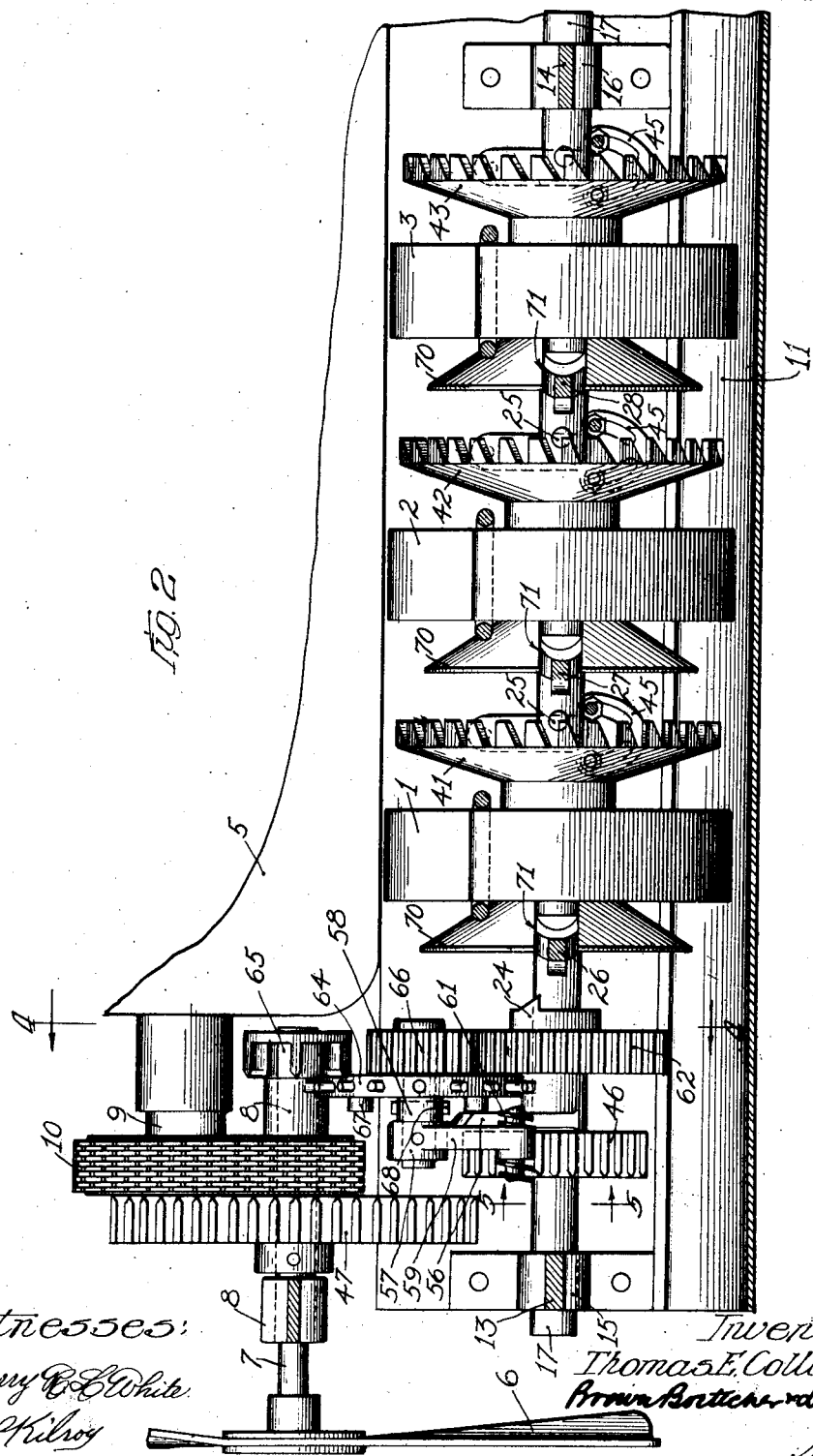
Fig. 2 is a horizontal sectional view taken substantially on the line 2—2 of Fig. 1.
Figure 4:
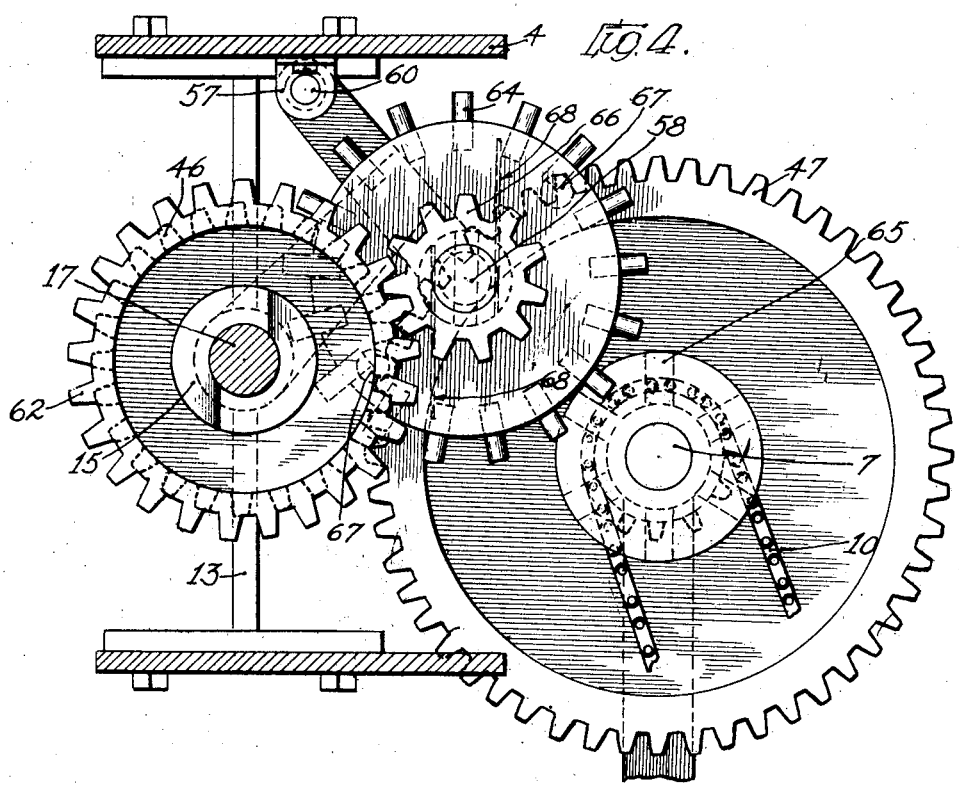
Fig. 4 is a vertical sectional view taken on the line 4—4 of Fig. 2.

As shown in Figs. 1, 2 and 4, upright posts 13 and 14 are mounted upon the bottom wall of the housing 4 adjacent the opposite ends thereof. These upright posts 13 and 14 serve as supporting members for the top wall of the housing 4 and further provide bearings 15 and 16 for a shaft 17. The axis of the shaft 17 is, in this particular embodiment of my invention, parallel with the axis of the crank shaft 9. The shaft 17 is mounted to rotate and to slide lengthwise in the bearings 15 and 16. When it is desired to start the engine 5, the shaft 17 is adapted to be shifted lengthwise in the bearings 15 and 16 as will be hereinafter described.

The outer convolutions of the power accumulating spiral springs 1, 2 and 3 are fixed to the upper wall of the housing 4. The inner or active convolutions of these springs are secured to sleeves 18, 19 and 20 respectively, which sleeves are freely mounted on the shaft 17. The forward ends of the sleeves 18, 19 and 20 are provided with clutch members 21, 22 and 23 respectively. The clutch or coupling member 21, carried by the sleeve 18 is adapted to coöperate when the sleeve 18 is shifted forwardly along the shaft 17, as will be hereinafter described, with a clutch or coupling member 24 fixed upon the shaft 17. Thus the sleeve 18 and consequently the inner or active convolution of the spring 1 will be securely coupled or connected directly to the shaft 17. The sleeves 19 and 20 are adapted to be clutched to the shaft 17 in a like manner by the coöperation of the clutch members 22 or 23 respectively, carried by these sleeves, with either of the pins 25 or 25′ respectively, which pins 25 and 25′ are fixed in the shaft 17 and project diametrically from either side thereof.

Appropriate levers 26, 27 and 28 are provided for shifting the sleeves 18, 19 and 20 respectively along the shaft 17. As shown in Fig. 3, the lower forked ends of the levers 26, 27 and 28 are provided with inwardly projecting pins or studs which engage in suitable annular grooves provided in the sleeves 18, 19 and 20 respectively, adjacent their forward ends. The levers 26, 27 and 28 extend upwardly through the top wall of the housing 4 and are pivoted at 29 in brackets 30, which brackets 30 are mounted upon the top wall of the housing 4. Either of these levers is adapted to be swung about its pivot 30 at the will of the driver by means of a longitudinal lever shifting shaft 31. The inner end of the shaft 31 preferably extends through the dash of the automobile and is provided with a suitable handle 32, which handle is disposed so as to be conveniently accessible to the driver at all times.

Owing to the employment of three power accumulating or starting springs in this particular embodiment of my invention, the lever shifting shaft 31 is preferably, although not essentially, of triangular cross-section, or as shown in Fig. 1, provided with a short portion 50 of triangular cross-section within its length. It is to be understood that any desired form of shaft may be employed, such as a shaft of circular or square cross-section. In employing a shaft of triangular cross-section or a shaft having a short triangular portion within its length, an independent longitudinal flat surface along the shaft 31 is provided for coöperation with a relatively strong leaf spring 38, to retain the shaft 31 in either of its angular positions. The relatively strong leaf spring 38 is suitably secured to the top of the housing 4, and extends upwardly therefrom, as is shown in Figs. 1 and 3, the upper free end of this leaf spring 38 coöperating with the flat longitudinal faces of the short triangular portion 50 to retain the lever shifting shaft 31 in any set position.

Three pairs of spaced pins, 33, 34 and 35, are arranged along the shifting lever 31 as shown in Fig. 1, one pair of these spaced pins coöperating with the upper free ends of the levers 26, 27 and 28 respectively. These pins 33, 34 and 35 are arranged at substantially 120° apart about the circumference of the shaft 31, as shown in Fig. 3, one pair projecting from the shaft 31 at substantially right angles to each of the flat longitudinal faces of the triangular portion 50, in order that only one of the levers 26, 27 or 28 will be engaged by its coöperating spaced pins at a time.

The opposite ends of the lever shifting shaft 31 are mounted for rotation and lengthwise movement in upright bearing members 36 and 37, respectively, which upright bearing members are mounted upon the top wall of the housing 4. When the shaft 31 is in the position shown in Fig. 3, the spaced pins 34, projecting therefrom, will be arranged adjacent the opposite edges of the upper free end of the lever 27, whereupon lengthwise movement of the shaft 31 in the bearings 36 and 37 will swing the lever 27 about its pivot 29, thereby shifting the sleeve 19 along the shaft 17. Upon revolving the shaft 31 in a clockwise direction substantially one third of a revolution the spaced pins 34 will be moved out of coöperation with the lever 27, and the spaced pins 33 will be moved into coöperation with the upper free end of the lever 26, a further one third revolution of the shaft 31 moving the pins 33 out of coöperation with the lever 26 and the pins 35 into coöperation with the lever 28. Equalizing springs 39 are arranged between the upright bearing member 36 and a pair of collars 40 fixed on the shaft 31, whereby this shaft and consequently the levers 26, 27 and 28 will be normally maintained in the position shown in Fig. 1.

Ratchet wheels 41, 42 and 43 having suitable radial teeth about their inner faces, are securely mounted upon the inner ends of the sleeves 18, 19 and 20, respectively. The radial teeth provided about the inner periphery of these ratchet wheels normally coöperate with suitable holding pawls 44 and 45, which holding pawls 44 and 45 are pivotally mounted upon the lower and upper walls respectively of the housing 4. This coöperation of the radial teeth of the ratchet wheels 41, 42 and 43 with the holding pawls 44 and 45, serves to retain the energy or spring tension in the power accumulating springs 1, 2 and 3, during re-winding or re-energization of the springs, and until such time that the driver desires to use such accumulated energy in starting the engine.

It will now be apparent that upon shifting either of the sleeves 18, 19 or 20 forwardly into engagement with either the clutch member 24 or the diametrically projecting pins 25 or 25′, that further movement of the sleeve forwardly will shift the entire shaft 17 forwardly in the bearings 15 and 16. As the shaft 17 is shifted forwardly, a gear 46 fixed upon the shaft 17 is thereby shifted into engagement with a gear 47 fixed upon the fan shaft 7 of the engine.

Figure 7:
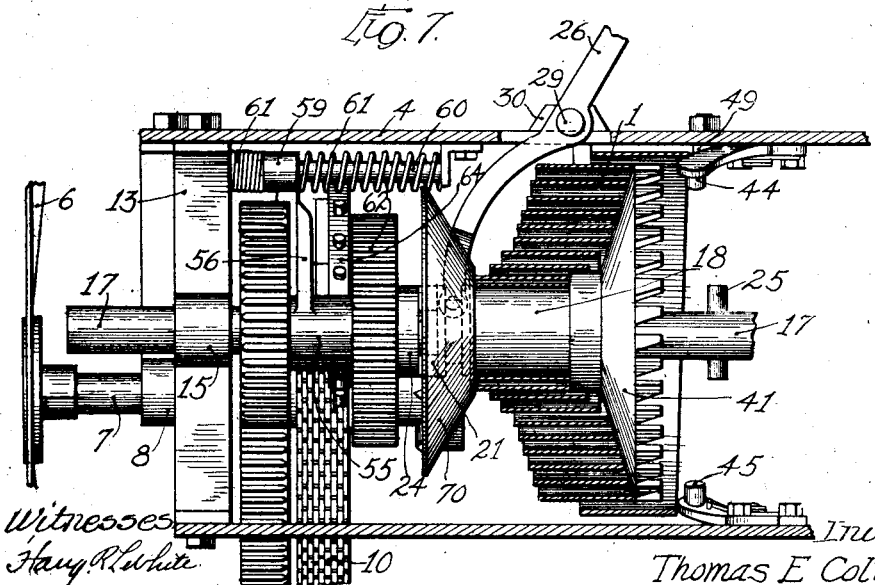
Fig. 7 is a vertical cross sectional view taken on the line 7—7 of Fig. 6.
Figure 8:
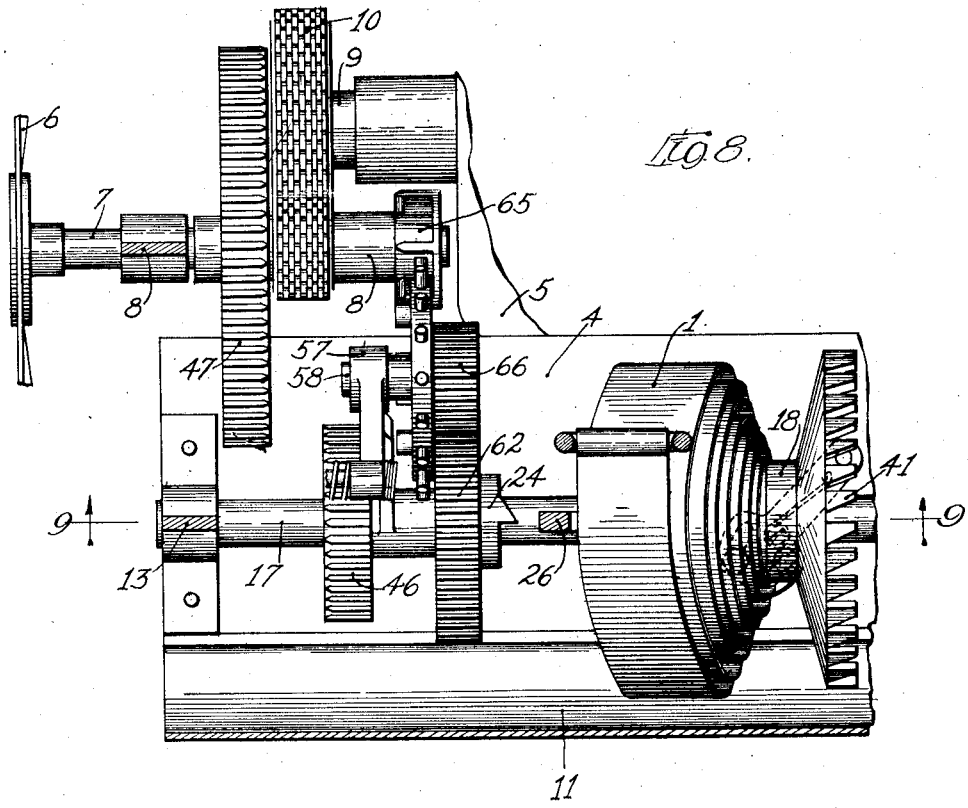
Fig. 8 is a view similar to Fig. 6 showing the relative positions assumed by the various parts upon reënergization of the starting mechanism.

As either of the sleeves 18, 19 or 20 is shifted forwardly, the ratchet wheel carried by the inner end of the sleeve will be likewise shifted forwardly, the pivoted holding pawls 44 and 45 therefore following the movement of the ratchet wheel, due to the tendency of the small coiled springs 48, until the stop pins 49 are engaged, as shown in Fig. 7. One of such stop pins 49 is provided in the forward path of travel of each of the holding pawls 44 and 45, projecting downwardly from the top wall and upwardly from the bottom wall, respectively of the housing 4. These pins 49 form suitable stops whereby further forward movement of the holding pawls 44 and 45 is prevented, and the ratchet wheel and consequently the inner or active convolution of the power accumulating spring is released, thereby driving the shaft 17 in a counter clockwise direction. The fan-shaft 7 will thereby be driven in a clockwise direction through the coöperating gears 46 and 47, thereby rotating the crank-shaft 9 through the chain-belt 10 to start the engine. The coöperating gears 46 and 47 are preferably so proportioned that a slow movement of relatively great power will be imparted to the crank-shaft 9 upon releasing the energy accumulated in the power storing springs.

Figure 5:
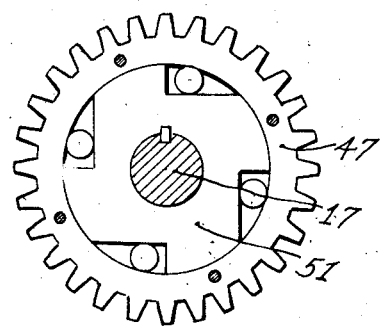
Fig. 5 is a detail vertical sectional view taken on the line 5—5 of Fig. 2.
Figure 6:
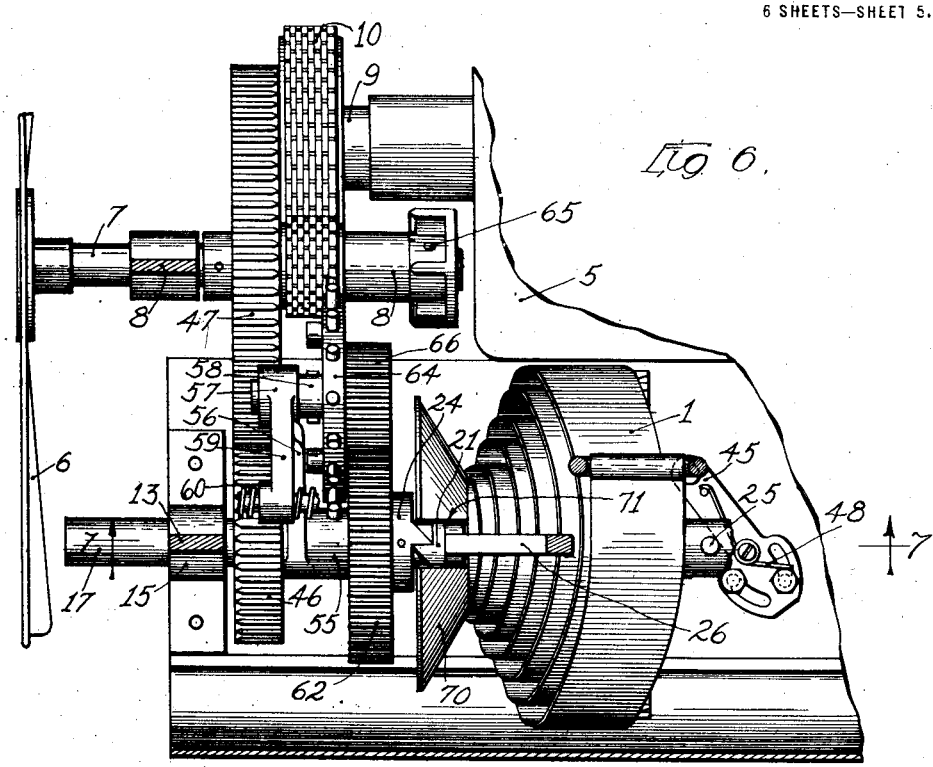
Fig. 6 is a fragmentary horizontal sectional view showing the relative positions assumed by the various parts upon starting the engine.

To overcome any difficulty that might arise should the speed of the engine shaft exceed the speed of the shaft 17 before the gear 46 is moved out of mesh with the gear 47, the gear 46 is fixed upon the shaft 17 through a suitable overrunning clutch 51, as is shown in Fig. 5. This overrunning clutch 51 may be of any desired type, forming no part of the present invention.

If rotation of the crank-shaft 9 through the spring 1 fails to start the engine, due to improper timing of the spark, severe weather conditions or the like, the proper adjustment may be made, and the lever shifting shaft 31 revolved substantially 120° by means of the handle 32, and either of the remaining energized starting springs released to rotate the crank-shaft in a like manner. Although one starting spring will be found to be sufficient to start the engine under all ordinary conditions, I have provided three springs, so that sufficient starting energy will be held in reserve to meet any emergency that might arise.

The inner end of the sleeves 18, 19 and 20 are provided with clutch members 52, 53 and 54, respectively, as shown in dotted lines in Fig. 1. A sleeve 55 having an arm 56 extending therefrom is loosely mounted on the shaft 17 adjacent the inner face of the gear 46. The outer sleeved end 57 of the arm 56 bears a relatively short stub shaft 58. An arm 59 extending diagonally upwardly from the sleeved end 57 of the arm 56 is slidably mounted upon a shaft 60, which shaft 60 is suspended from the top wall of the housing 4, as is shown in Figs. 1 and 4. Equalizing springs 61 are provided for maintaining the arm 56, shaft 58 and consequently the shaft 17 in substantially the positions shown in Figs. 1 and 2. A gear 62 is fixed upon the shaft 17 adjacent the inner face of the sleeve 55, for a purpose which will be hereinafter apparent.

Upon starting the engine 5, and releasing the handle 32 and consequently the shaft 31, this shaft will obviously be returned to substantially the position shown in Fig. 1 by the equalizing springs 39. The shaft 17 will likewise be automatically returned to substantially the position shown in Figs. 1 and 2 by the equalizing springs 61, the gear 46 fixed upon the shaft 17 being thereby moved out of mesh with the gear 47, which gear 47 is fixed upon the fan-shaft 7 of the engine, as has been described.

Assuming that the energy stored in the spring 1 has been spent in starting the engine, that the engine is running under its own power and that the handle 32 has been released and the shafts 17 and 31 returned to the positions shown in Fig. 1 by the equalizing springs 61 and 39, respectively, as has been described.

To reënergize the spring 1—either of the springs 1, 2 or 3 being reënergized in a similar manner—the lever shifting shaft 31 is revolved until the spaced pins 33 projecting therefrom are brought into coöperation with the upper free end of the lever 26, the leaf spring 38 positively retaining the shaft in this position. By means of the handle 32, the lever shifting shaft 31 may then be shifted axially outwardly, thereby swinging the lever 26 about its pivot 29, shifting the sleeve 18 inwardly along the shaft 17, and moving the clutch member 52 carried by the inner end of the sleeve 18 into engagement with the diametrically projecting pin 25. It will now be apparent that the sleeve 18, and consequently the inner or active convolution of the spring 1 fixed thereto, is fixed to the shaft 17 through the clutch member 52, and the diametrically projecting pin 25. Further movement of the sleeve 18 through the lever 26 will shift the entire shaft 17 inwardly in the bearings 15 and 16.

Figure 9:
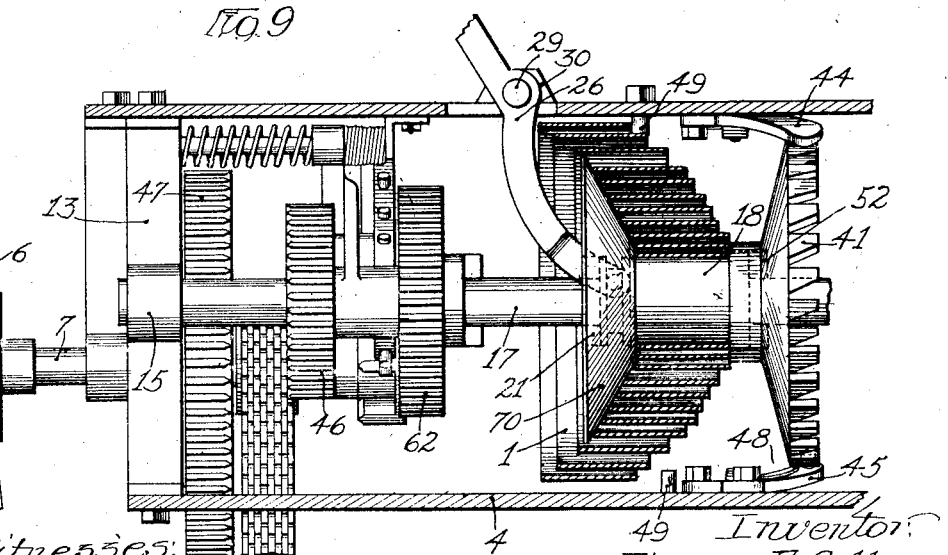
Fig. 9 is a vertical sectional view taken on the line 9—9 of Fig. 8.

As the shaft 17 is shifted inwardly a tooth-wheel or gear 64, loosely mounted upon the stub shaft 58, carried by the arm 56, is moved into mesh with a pinion 65, fixed upon the inner end of the fan-shaft 7. The unwound convolutions of the spring 1 are simultaneously forced into substantially the position shown in Fig. 9, by means of a flared sleeve 70. The flared sleeves 70 are carried by the outer ends of the sleeves 18, 19 and 20 respectively, being retained against axial or longitudinal movement relative to the sleeves 18, 19 and 20, although the connection therebetween is such that rotation of the sleeves 18, 19 and 20 relative to the flared sleeves 70 is allowed. The upper peripheries of the flared sleeves 70 are notched, as shown at 71 in Fig. 2, in order that the levers 26, 27 and 28 may extend upwardly therethrough without in any way interfering with the proper operation thereof.

An idler pinion 66, fixed upon the stub-shaft 58, is constantly in mesh with the gear 62, fixed upon the shaft 17. As soon as the gear 64 is moved into mesh with the pinion 65, the gear 64 will be rotated, a pair of pins 67 projecting from the outer face of the gear 64, (as shown in Figs. 2 and 4), coöperating with a pair of yieldable arms 68, which yieldable arms 68 are carried by and project from the stub-shaft 58 to rotate this shaft, and consequently the idler pinion 66 fixed thereon. The yieldable arms 68 carried by the stub-shaft 58, and the pins 67 projecting from the outer face of the gear 64 provide a yieldable drive from the fan shaft 7 to the stub-shaft 58. Rotation of the idler pinion 66 in this manner drives the shaft 17 in a clockwise direction through the gear 62, consequently rotating the sleeve 18 fixed to the shaft 17 through the clutch 52 and pin 25 to wind the spring 1 or re-store the same with energy.

The inner convolutions of the spring 1 are thus wound about the flared sleeve 70 until sufficient energy has been stored in the spring 1, whereupon the tension of the spring acting upon the flared sleeve 70, will be sufficient to force this sleeve, and consequently the sleeve 18 secured thereto, outwardly along the shaft 17. The clutch member 52 carried upon the inner end of the sleeve 18 is thereby automatically moved out of engagement with the diametrically projecting pin 25 fixed in the shaft 17; when the spring 1 has been sufficiently energized, the lever 26 being returned to its normal position by means of the equalizing springs 39.

The energy or spring tension is retained in the power accumulating spring 1 by means of the holding pawls 44 and 45 during re-winding or reënergization of the spring, and until such time that the driver desires to use such energy in starting the engine, whereupon this accumulated energy may be released, as has been described. As the springs 2 and 3 are reënergized in a similar manner, it is believed that the above description will be sufficient.

While I have described my invention in connection with the details of a particular embodiment, it is to be understood that this embodiment is merely illustrative, and I do not intend thereby to limit the invention to such details, as I am aware and contemplate that modifications and changes may be made without departing from the scope of my invention which is set out in the appended claims.

I claim:

1. In combination, an engine shaft, a starter shaft, a sleeve loosely mounted on said starter shaft, a spring motor normally held under tension, adapted for rotating said sleeve, manually controlled means for coupling said sleeve to said starter shaft, said manually controlled means thereafter serving to shift said starter shaft into driving connection with the engine shaft, and means for releasing the spring motor to start the engine.

2. In combination, an engine shaft, a starter shaft, a sleeve loosely mounted on said starter shaft, a spring motor normally held under tension and adapted for rotating said sleeve, manually controlled means for coupling said sleeve to said starter shaft, said manually controlled means thereafter serving to shift said starter shaft into driving connection with the engine shaft, and means for releasing the spring motor to start the engine, means for uncoupling said shafts upon starting the engine, means for again coupling said sleeve to said starter shaft, said means thereafter serving to shift said starter shaft into driving connection with the engine shaft to reënergize said spring motor and means for automatically disconnecting the engine shaft and said starter shaft upon reënergization of said spring motor.

3. In combination, an engine shaft, a starter shaft, a member loosely mounted on said starter shaft, means for shifting said member along said shaft, a spring motor connected to said member, movement of said member in one direction coupling said spring motor to said starter shaft and thereafter shifting the starter shaft into driving connection with said engine shaft to start the engine, movement of said member in the opposite direction coupling said spring motor to the starter shaft and thereafter shifting said starter shaft into driving connection with the engine shaft to reënergize said spring motor.

4. In combination, an engine shaft, a housing, a starter shaft journaled therein, a member loosely mounted on said starter shaft, means for shifting said member along said shaft, a spring motor normally held under tension fixed to said housing and connected to said member, movement of the member in one direction coupling said spring motor to said starter shaft and thereafter shifting said starter shaft into driving connection with the engine shaft and releasing said spring motor to start the engine, movement of said member in the opposite direction coupling the spring motor to the starter shaft and thereafter shifting the starter shaft into driving connection with the engine shaft to reënergize said spring motor and means for automatically disconnecting said spring motor and said engine shaft upon reënergization of the spring motor.

5. In combination, an engine shaft, a starter shaft, a sleeve loosely mounted upon said starter shaft, a spring motor normally held under tension and adapted for rotating said sleeve, means for coupling said sleeve to the starter shaft and for shifting said starter shaft into driving connection with the engine shaft to energize said spring motor and means for automatically uncoupling said sleeve from said starter shaft when said spring motor has been sufficiently energized.

6. In combination, an engine shaft, a housing, a starter shaft journaled therein, a plurality of energy storing devices in said housing, independent controlling levers for each of said energy storing devices, a longitudinal lever shifting shaft coöperating with said controlling levers whereby either of said energy storing devices may be coupled to the engine shaft and the energy therein released to start the engine, and means for reversing the direction of rotation between said engine shaft and said starter shaft, whereupon rotation is imparted from the engine shaft to the starter shaft to restore energy in said energy restoring device.

7. In combination, an engine shaft, a housing, a starter shaft journaled therein, a plurality of energy storing devices in said housing, independent controlling levers for each of said energy storing devices, a longitudinal lever shifting shaft coöperating with said controlling levers whereby either of said energy storing devices may be energized by coupling the same to the starter shaft and then connecting the starter shaft to the engine shaft.

8. In combination, a driven shaft, a member loosely mounted thereon, a spring connected to said member and adapted to be placed under tension, a flared member carried by said first member, coupling means between said first member and said shaft whereby said spring is wound upon said flared member, engagement between said spring and said flared member upon winding the spring thereupon causing the coupling means between said first member and said shaft to be automatically disconnected upon placing said spring under tension.

9. In combination, an engine shaft, a starter shaft, a starter unit normally disconnected from each of said shafts, mechanism operable to first connect the starter unit to the starter shaft, then shift the starter shaft into driving connection with the engine shaft and then release the starter unit to start the engine, and means for reversing the drive between said starter shaft and said engine shaft, whereupon rotation is imparted from the engine shaft to the starter shaft to restore energy in said starter unit.

10. In combination, an engine shaft, a starter shaft, a starter unit associated with said starter shaft, mechanism operable to release said starter unit, whereupon rotation is imparted from said starter shaft to said engine shaft, means for uncoupling the starter unit from the starter shaft upon starting the engine and means for thereafter connecting the starter unit with the starter shaft and shifting the starter shaft into driving connection with the engine shaft to restore energy in the starter unit.

11. In combination, an engine, an engine shaft, a starter shaft having its axis offset relative the axis of said engine shaft, said starter shaft being positioned along one side of the engine, a starter unit associated with said starter shaft, means for placing said starter shaft in driving connection with the engine shaft and releasing said starter unit to impart rotation from the counter shaft to the engine shaft to start the engine, and means for reversing the direction of drive between said shafts whereupon rotation is imparted from the engine shaft to the starter shaft to restore energy in said starter unit.

In witness whereof, I hereunto subscribe my name this 12th day of February, A. D. 1919.

THOMAS E. COLLINS.